L. READ.

Millstone-Balancing Devices.

No. 9,091. Reissued Feb. 24, 1880.

Witnesses.
A. Ruppert,
J. G. Mason

L. Read
Inventor.
By R. Mason.
Atty.

N. PETERS, PHOTO-LITHOGRAPHER, WASHINGTON, D. C.

UNITED STATES PATENT OFFICE.

LUTHER READ, OF HENDERSON, NEW YORK.

MILLSTONE-BALANCING DEVICE.

SPECIFICATION forming part of Reissued Letters Patent No. 9,091, dated February 24, 1880.

Original No. 192,454, dated June 26, 1877. Application for reissue filed November 7, 1879.

*To all whom it may concern:*

Be it known that I, LUTHER READ, of Henderson, in the county of Jefferson and State of New York, have invented a new and useful Improvement in Millstone-Balances, of which the following is a specification.

The object of this invention is to enable a millstone to be accurately balanced, both standing and running, in a very short time.

Figure 1:
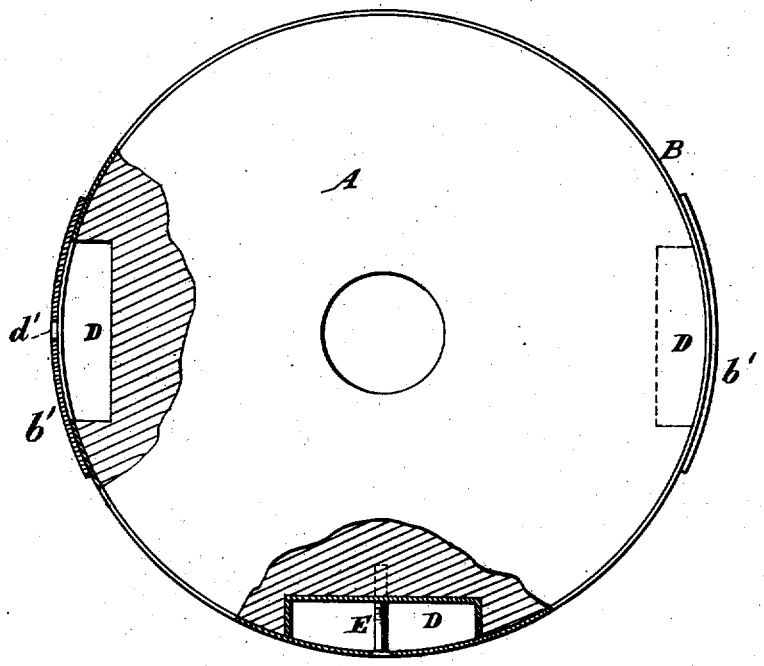
Figure 2:
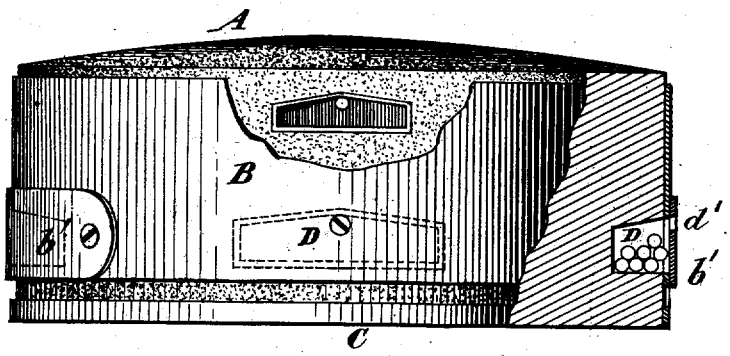

A represents a millstone, which is bound with a wide upper band, B, and a narrow lower band, C, in the usual way. In the upper and lower parts of each quarter of the stone A is formed a horizontal cup, D. The lower cup D is level with or a little below the cockeye, and the upper cup is at or near the upper edge of the band B. The cups D are made with straight bottoms and ends, and with their tops inclining upward from their ends to the center, as shown in Figs. 1 and 2. The cups D, I prefer to make about nine inches long, about one and a quarter inch deep, and about one and a half inch high in the widest part or center. The cups D are covered or closed by the band B, and through said band, at the top or angle of each cup D, is formed a hole, *d'*, which hole is closed with a screw, E. The holes *d'* should be large enough for shot to pass through them. Should too many shot be put into the cups, by turning the stone A over, so as to bring the angle of the top of the cups D downward, the shot will run out through the holes *d'*.

In the use of old stones the lower cups D may be formed in the stones through holes cut in the band B, which holes are afterward covered by patches *b'*, secured to the band B by screws. In this case the upper cups D may be formed by removing a part of the plaster, putting in the shot, and replacing the plaster. The upper cups D are designed for use for balancing the stone when it is heavy on top upon one side and heavy on the bottom on the other.

I am aware that devices have heretofore been employed or patented and described for regulating the balance of millstones by radially or vertically adjustable weights; but my invention is distinguished from all of these in the use of cups or cavities in the periphery of the stone, placed both above and below the plane of suspension, so that they may be made readily in millstones with bands, as ordinarily constructed, and the balance can be conveniently adjusted by adding or subtracting weight above or below the plane of suspension, so as to adjust both the standing and running balance. This cannot be done at all with the merely radially-adjustable weights. In those provided with weights vertically adjustable by means of screws, the holes to receive the weights are formed only in the plaster portion of the stone, extending down to the burr-stone blocks. Whereas much of the irregularity in the weight of millstones comes from the different sizes and texture of the burr-stone blocks, it follows that any system of adjustment which is entirely above those blocks is essentially defective, and in this all such devices differ from mine, in which the lower series of cups are cut in the stone, thus correcting the irregularity in the part of the millstone in which it occurs.

The form of the cavity also permits the shot to be withdrawn, when the stone is reversed, by simply taking out the plug which closes the hole *d'*, and no mechanism whatever is employed, such as is required where the position of the weight is controlled by means of screws.

Again, the shape of the recess—long in the direction of the arc and shallow radially—enables the weight to be applied farther from the point of suspension than is possible with the radially-adjustable weights placed, necessarily, in deep recesses, thereby permitting the balance to be perfected with less added or subtracted weight.

What I claim as my invention, and desire to secure by Letters Patent, is—

1. A millstone constructed with peripheral cups or cavities placed in each quarter and in different planes, for the reception of weights to regulate the standing and running balance by varying the relative weight above or below the plane of suspension, substantially as set forth.

2. A millstone constructed with shallow peripheral cups cut in the stone, and another series of similar cups cut in the plaster above the plane of suspension, and having holes through the band for the introduction or withdrawal of the counterbalancing material, substantially as set forth.

3. A millstone constructed with cups sunk in the periphery of the stone, the tops of which are inclined so as to form chambers for the weights to run out at the end by gravity when the stone is reversed and the stoppers are removed, substantially as set forth.

As witness my hand this 30th August, 1879.

LUTHER READ.

In presence of—
R. MASON,
JNO. G. MASON.